Patented May 19, 1942

2,283,820

UNITED STATES PATENT OFFICE 2,283,820

METHOD FOR MAKING MOLDED LIGNO-CELLULOSIC PRODUCTS

Arlie W. Schorger and John H. Ferguson, Madison, Wis., assignors to Burgess Cellulose Company, Freeport, Ill., a corporation of Delaware No Drawing. Application September 12, 1938,
Serial No. 229,527

4 Claims. (Cl. 260—9)

This invention relates to an improved method for cooking natural lignocellulose by means of water or steam to furnish a material, which, after washing and drying, may be hot-molded to produce hard resinous materials. The invention also relates to the products produced thereby.

This application is a continuation in part of Serial No. 184,768 filed January 13, 1938.

It is an object of this invention to improve the prior processes for making the plastic lignocellulose products referred to above and products formed thereby, to render the products more plastic, stronger and more water-resistant.

Briefly, the primary process consists in cooking a natural lignocellulosic material with water, alone or with added materials, within a limited range of temperatures and for a predetermined time to render water-soluble a part of the lignocellulosic maerial and to particularly dissolve the hemicelluloses. The residual product, after extraction of the water solubles and subsequent drying, contains a large part of the original thermoplastic resinous lignin, as well as cellulosic fibre intrinsically unchanged. This product may be hot-molded under pressure but without the addition of a binder, into a hard, resinous product having a high strength and a high resistance to the absorption of water.

The raw material for the process is any natural lignocellulosic material such as wood, corn cobs, straw, bagasse, corn stalks, etc. When a natural lignocellulosic material is referred to herein it includes manufactured products such as newsprint containing, for example, 70%-90% of coniferous ground wood. The ground wood therein is substantially in its original or natural condition.

The lignocellulosic material, after being ground or otherwise comminuted, is cooked at elevated temperatures with water, preferably containing a buffer, or a potential buffer, salt, or mixture of such salts, the purpose of which is to continuously neutralize the acids produced from the hydrolytic fission and at the same time form with these acids other salts which act in a buffer capacity. Part of the hemicelluloses or other binding materials are thereby dissolved. The time, temperature, and pressure used during the cooking operation may vary within limits depending upon the specific properties desired in the final product. This application is concerned specifically with the control of the cooking liquor during the cooking operation.

Although water alone may be used during the cooking operation, a small amount of buffers, or active chemicals producing buffers, should be added during the cook to neutralize the acetic and other acids split off from the wood, and thereby form salts of these acids which further control the process by preventing too much cellulose degradation, yet allowing hemicellulose hydrolysis. This is accomplished by adding basic chemicals to the cook such as lime, other alkaline earth hydroxides, calcium carbonate or other alkaline earth carbonates, alkali carbonates, alkali triphosphate, etc. If the alkalinity at the end of the cook is such that the pH is above 7.0 the action may be too drastic, lignin being attacked and dissolved. The amount should be such that the cook is slightly acid at the end of the cooking operation, it usually having a pH of 5.0 to 6.0. For example, 2½% of lime, $Ca(OH)_2$, based on the weight of the air-dried lignocellulosic material, may be added to the wood, before cooking. The other alkaline earth hydroxides may be used. Calcium carbonate, or other alkaline earth carbonate, is more desirable since it maintains the optimum pH automatically. About 5% is the average amount which produces good results. A mixture of calcium hydroxide and sodium acetate may be used to advantage, for example, 2.5% of the former with 2% of the latter producing a molded article which exhibits an increased water resistance. A mixture of calcium hydroxide and sodium sulphite may be used. If more than enough alkali or alkaline earth base is used than is necessary to neutralize the acid formed, the lignin may be attacked, thereby decreasing the amount of binder available in the molding compound. Sodium phosphate also is a good buffer whereas ammonia is a convenient alkali which may be added to the cook to neutralize the acetic acid liberated. The calculated amount of alkali carbonate may be used. A mixture of alkali and alkaline earth carbonates is effective. Continuous neutralization during the cooking process is desirable to secure a well-flowed, water-resistant and strong product.

The use of buffers as previously described is not limited to cooks in which water is the primary cooking liquid. As will be pointed out hereinafter, the advantages of pH control may also be obtained in cooks in which aniline is added to the water and in those in which aniline alone is used. For example, in one instance where the aniline cook was not buffered the breaking strength of the hot-molded product was 5170 pounds with a water-absorption of 1.62%. With the hot-molded product of a similar cook in which 5% of calcium carbonate was used to maintain a suitable hydrogen ion concentration the breaking strength was raised to 7520 pounds and the water absorption was lowered to 1.23%.

The cooking temperature and the cooking time are closely related insofar as the strength of the molded product is concerned. The presence of moisture in the molding compound during the molding operation affects appreciably the properties of the molded product. The hydrogen ion concentration during the molding operation also is a factor. If the water absorption of the molded product is unimportant then cooking temperatures (one hour cooking time) of from 135° to 185° C. with hardwood sawdust give the best results. In a specific instance a one hour cook at 135° C. gave a product having its maximum strength when molded dry. When molded moist the maximum strength resulted when the hardwood sawdust was cooked at a temperature of 155° C. With the cooking time decreased to 15 minutes and a cooking temperature of as high as 195° C. a molded product resulted which had excellent strength, though the maximum strength resulted with material cooked at from 165° C. to 190° C. This product which had been cooked 15 minutes, when molded dry had substantially greater strength than that which was molded moist. In general, it is usual to cook at 180° C. to 200° C. for 30 to 60 minutes for optimum results.

The water absorption and extent of flow of the molded product appear to be more closely related to the cooking temperatures and pressures than does its strength. Tests indicate that the maximum resistance to moisture is developed when the cooking temperature, using hardwood sawdust as the lignocellulosic material, is from 180° C. to 195° C. regardless of whether the cooking time is 15 minutes or one hour though these variables in themselves affect the water absorption. For example, the moisture resistance of a moist-molded product decreases rapidly as the cooking temperature decreases below 165° C. with a cooking time of one hour. If the same material is dry-molded the water resistance is substantially less and decreases rapidly at cooking temperatures below 165° C. The same material cooked for 15 minutes and moist-molded has an excellent water resistance when cooked at temperatures above 185° C. but at temperatures somewhat below this disintegrates upon being immersed in water for several days. If dry-molded this product exhibits less water resistance but greater strength. Cooking at above about 195° C. apparently affects the strength adversely but improves the water resistance, though each natural lignocellulosic material has its particular characteristics, and variations from the above data may be expected for the various raw materials.

During the cooking operation a part of the hemicelluloses and other constituents of the wood are dissolved. From 20% to 50% of the natural lignocelluloses are dissolved, 30% being about the average for wood. Corn cobs lose about 50% in weight on cooking at 185° C. for 1 hour; newsprint loses about 23% under the same conditions, and straw about 44%.

After the cooking operation is completed the cooked product is washed with water to remove substantially all of the parts rendered water-soluble. The wet pulp, which is dark brown in color, is then dried. When dried at 110° C. less than 1% of moisture remains, usually from 0.50% to 0.75%. The dried product, called the "primary material," is disintegrated in a mill to a powder which should pass through at least a 40-mesh screen and preferably a finer screen. The 65 mesh material gives excellent results. Thus, when powdered it is in a form for use as a molding compound either alone or in combination with, for example, other organic materials. The primary material thus made consists of a filler and a binder. The filler is largely the cellulose of the lignocellulosic raw material. The binder is primarily the substance resulting from the action of water on the lignin during the cooking operation. Other fillers and binders may be added to the primary material.

This molding-powder is plastic under hot-molding conditions and is well suited to molding operations. A small amount of moisture, usually 1.0% or more, present in the powder is advantageous since the powder is rendered more plastic and the moisture resistance is increased as hereinbefore explained. The primary product may be molded at a pressure of 1600 to 5000 pounds per square inch, a pressure of 3000 pounds being a favorable one, while it is maintained at an elevated temperature, usually above 100° C. A favorable temperature is 185° C., though temperatures of over 200° C. may be used. The molding time should be sufficient to produce the desired hard and resinous properties, 2 to 15 minutes usually sufficing for small objects. The material is preferably molded by giving it a preliminary cold press in the mold at high pressure, 6000 to 7000 pounds per square inch, and then dropping the pressure. The mold is then heated. As the product heats the pressure again rises. After being subjected to the desired pressure as hereinbefore specified for the necessary time, the mold may be cooled while maintaining some pressure. Hot or cold ejection is used.

The resultant product is hard, has a resinous appearance, remains thermoplastic and has many of the properties of products made by molding mixtures of a resin such as Bakelite and a filler such as wood flour. The moisture absorption is very low, for example, usually less than 2% when a 2 inch disk $\frac{3}{32}$ inch in thickness is immersed in water for 18 hours at room temperatures. The modulus of rupture varies with the different materials. In a specific example it was 7000 pounds per square inch when molded with a small amount of water and 8400 pounds per square inch when molded dry. The density varied from 1.40 to 1.45. The best results are obtained if the hydrogen ion concentration of the primary product is controlled during molding by the addition of a buffer such as sodium acetate.

A small amount of zinc stearate, for example, 1%, may be mixed with the molding-powder to secure better release in the mold. The zinc stearate acts as a lubricant and also aids the water resistance.

The water resistance, plasticity and strength of the molded product may be increased by adding a number of materials to the primary product, for example, small amounts (1% to 10%) of phenols, organic amines, sugars, oils, waxes, resins, proteins, mixtures of these and additional lignin as described in detail in the parent application.

In the above description the primary lignocellulosic material is cooked in water, preferably buffered as described. The primary molding product thereby produced is somewhat deficient in plasticity and water resistance. This deficiency may be overcome by raising the lignin content of the primary product above the amount resulting from that occurring naturally in the lignocellulosic raw material in such a way as to insure a homogeneous lignin content. Although this increased lignin content may be obtained by mixing lignin produced separately to the primary material we prefer to obtain this increase by using as the cooking liquor the so-called "black-liquors" of wood pulping processes now used extensively in the paper industry. These black-liquors are rich in dissolved ligneous materials which appear more reactive chemically when utilized in this way than those resulting from the hydrolytic action of strong mineral acids on lignocelluloses. The ligneous material obtained directly from alcoholic or alkaline extracting mediums are particularly desirable. The use of these liquors does not entail any pre-purification before use and thereby obviates any possibility of lignin degradation.

The black liquor, for example, from the soda or sulfate process, if too alkaline is neutralized to the desired alkalinity by means of an acid such as sulfuric acid, the lignin adjusted as desired by the addition of water and the lignocellulosic material cooked therein as described above, or in the presence of a buffer. If the black liquor is neutral or acid, an alkaline material, such as calcium hydrate, may be added. Calcium carbonate also may be used. The lignin of the black liquor is precipitated during the cook upon the natural lignocellulosic material. The dried primary product thereby produced has the necessary plasticity particularly if the pH of the cooking liquor is controlled as previously described. An added plasticizer is not required although the water content is substantially lower than 1% (drying at 110° C.). The primary product when hot-molded has excellent water resistance and strength.

The amount of lignin added varies with the desired results, the amount of lignin in the lignocellulosic material to which it is added and upon the source of the lignin. A smaller amount of lignin obtained from soda black liquor appears to be as effective as a larger amount from sulfate black liquor. For example, 10% of added lignin usually is effective, but the amount may vary over a wide range. Lignin obtained from a butanol cook seems to be as effective as that obtained from the sulfate process. The primary material containing the added lignin may be used for those products which are more difficult to mold, that is, for those usually requiring a material of high plasticity.

The above named buffering materials are also when other chemicals, such as aniline, formaldehyde, or dimethylaniline are used in the cooking liquor.

Other substances which may be added to the cook are a mixture of lime (Ca(OH)$_2$) and sulfur and a mixture of lime and sodium polysulphide. The latter combinations impart to the product on molding a high and resinous luster as well as exhibiting other pleasing effects.

Following are specific examples which illustrate practical embodiments of our process so that those skilled in the art may practice it. The time of molding given is for articles about 0.10 to 0.20 inch thick. The invention is not limited to these specific examples.

(1) One part of maple sawdust is cooked with 1 part of water and 5% of calcium carbonate (of the weight of the air-dry sawdust) in an autoclave at a temperature of 185° C. for one hour, the pH at the end of the cook being about 5.5. The cooked material is filtered in a filter press and washed with water until the water solubles are removed. The pH should be within the range 5.5–7.0. The filter cake is dried at 110° C. to below 1% water. The dried material is divided into four parts after disintegrating to a 100-mesh powder in a mill. (a) The first part is mixed with about 2% pine oil and 1% zinc stearate, introduced into a cold mold and pressed at 7000 pounds per square inch. The pressure is then dropped to about zero and the mold is then heated to 185° C. The pressure in the mold is permitted to build up as a result of the temperature rise to 3000 pounds per square inch for 10 minutes. Cold ejection is used. (b) To the second portion of powdered primary product 2.0 per cent by weight of a mixture of equal parts of phenol and aniline is added and incorporated thoroughly therewith. This mixture is hot molded for 10 minutes at a pressure of 5000 pounds per square inch and at a temperature of 185° C. (c) The third portion of powdered primary product is mixed with 2 per cent mineral oil and ½ per cent zinc stearate, introduced cold into a mold and prepressed at 6000 pounds per square inch. The pressure is dropped to 5000 pounds per square inch and the mold heated to 170° C. for 10 minutes at this pressure after which it is cooled and the product ejected. (d) To the fourth portion 2 per cent of paraffin is added and the mixture pressed hot at 3300 pounds per square inch.

(2) One part of wheat straw, to which is added 2½ per cent of calcium hydroxide is cooked with 1 part of water at 185° C. for one hour. The material is washed with water to remove solubles and dried at 110° C. The dried material is ground to pass a 40-mesh screen. Five per cent of dextrose is added and the mixture molded at 3000 pounds per square inch for 7 minutes at 180° C.

(3) One part of maple sawdust is mixed with one part of sulfate black liquor containing 10 per cent precipitable lignin, the alkali content of which is neutralized to about pH 5.5–6.5, by means of sulfuric acid. About 5% of calcium carbonate is added to the cooking liquor. Some brown lignin substances may gel in the liquor. The mixture is cooked for one hour at 180° C. The pH should be between 5 and 5.5 at the end of the cook and preferably about 5.5. The resulting solids are washed thoroughly, dried, and ground through 60 mesh. The resulting primary product may be molded in the usual way with or without the addition of moisture, oils, waxes, sugars, phenols or organic amines as set forth in the previous examples.

(4) One hundred fifty parts by weight of maple sawdust are mixed with 4.5 parts by weight of aniline and 1.5 parts of formaldehyde. With this is mixed a cooking liquor consisting of 75 parts soda black liquor containing 9 per cent precipitable lignin, 75 parts additional water and enough sulfuric acid to decrease the pH to 6.5–7.0. About 5% of calcium carbonate is added to the cooking liquor. The mixture is cooked at 180° C. for one hour. The resulting solids are dried to 5 per cent moisture and hot molded.

We claim:

1. The method for producing a thermoplastic lignocellulosic material having the property of plastic flow under heat and pressure molding conditions of 185° C. and 3000 pounds per square inch respectively, with formation of hard, water-resistant, resin-like products, which comprises cooking subdivided natural lignocellulosic material with water at a temperature of approximately 135° C. to 200° C. for approximately 15 minutes to an hour to dissolve at least a part of the hemicelluloses and render said lignocellulosic material thermoplastic, said water containing added thereto a material selected from the group consisting of alkaline earth hydroxides and carbonates in an amount such as to produce a pH of approximately 5.0 to 7.0 in the cooked mass at the end of the cook, and water-washing, drying and reducing said cooked material to a powder.

2. The method of claim 1 in which the added material is calcium carbonate.

3. The method of claim 1 in which the added material is calcium hydroxide.

4. The method of claim 1 in which the added material is present in an amount equal to approximately 2½% to 5½% of air-dry weight of the natural lignocellulosic material.

ARLIE W. SCHORGER.
JOHN H. FERGUSON.

CERTIFICATE OF CORRECTION.

Patent No. 2,283,820. May 19, 1942.

ARLIE W. SCHORGER, ET AL.

It is hereby certified that error appears in the printed specification of the above numbered patent requiring correction as follows: Page 1, first column, line 21, for "maerial" read --material--; page 2, second column, line 60, after "1.45" insert a period; page 3, first column, line 64, after "also" insert --used--; and that the said Letters Patent should be read with this correction therein that the same may conform to the record of the case in the Patent Office.

Signed and sealed this 7th day of July, A. D. 1942.

(Seal)

Henry Van Arsdale,
Acting Commissioner of Patents.